(12) United States Patent
Vencelj et al.

(10) Patent No.: US 10,191,161 B1
(45) Date of Patent: Jan. 29, 2019

(54) DEVICE AND METHOD FOR THE LOCATION AND IDENTIFICATION OF A RADIATION SOURCE

(71) Applicant: Consolidated Nuclear Security, LLC, Oak Ridge, TN (US)

(72) Inventors: Matjaz Vencelj, Ljubljana (SI); Toni Petrovic, Ljubljana (SI); Andrej Kosicek, Podsreda (SI); Ashley C. Stowe, Knoxville, TN (US); Jonathan S. Morrell, Farragut, TN (US)

(73) Assignees: Consolidated Nuclear Security, LLC, Oak Ridge, TN (US); Jozef Stefan Institute, Ljubljana (SI); AlSense d.o.o, Podsreda (SI)

( * ) Notice: Subject to any disclaimer, the term of this patent is extended or adjusted under 35 U.S.C. 154(b) by 0 days.

(21) Appl. No.: 15/585,669

(22) Filed: May 3, 2017

Related U.S. Application Data

(63) Continuation of application No. 15/474,626, filed on Mar. 30, 2017.

(51) Int. Cl.
*G01T 1/20* (2006.01)
*G01T 1/17* (2006.01)
(Continued)

(52) U.S. Cl.
CPC .............. *G01T 1/2008* (2013.01); *G01T 1/17* (2013.01); *G01T 1/36* (2013.01); *G01T 3/06* (2013.01); *G01T 3/08* (2013.01); *G01V 5/0075* (2013.01)

(58) Field of Classification Search
CPC .................................................... G01T 1/2008
See application file for complete search history.

(56) References Cited

U.S. PATENT DOCUMENTS 5,393,981 A * 2/1995 Szabo .................. G01T 3/06
  250/367
7,335,891 B2  2/2008 Kniss et al.
(Continued)

FOREIGN PATENT DOCUMENTS

SI          24520 A        10/2013

*Primary Examiner* — Yara B Green
(74) *Attorney, Agent, or Firm* — Clements Bernard Walker PLLC; Christopher L. Bernard

(57) ABSTRACT

A handheld device for the location and identification of a radiation source, including: a radiation transparent housing; a radiation locator device disposed within the radiation transparent housing operable for determining the location of the radiation source, wherein the radiation locator device includes a plurality of gamma detection crystals arranged in a geometric pattern and separated by a gamma shielding material, a plurality of detectors coupled to the plurality of gamma detection crystals, and a processor module coupled to the plurality of detectors; one or more of a neutron detection crystal and a gamma spectroscopy crystal disposed within the radiation transparent housing adjacent to the radiation locator device; and one or more detectors coupled to the one or more of the neutron detection crystal and the gamma spectroscopy crystal and the processor module; wherein the one or more of the neutron detection crystal and the gamma spectroscopy crystal, the one or more detectors, and the processor module are collectively operable for identifying the radiation source.

14 Claims, 2 Drawing Sheets

(51) Int. Cl.
*G01T 3/06* (2006.01)
*G01T 3/08* (2006.01)
*G01V 5/00* (2006.01)
*G01T 1/36* (2006.01)

(56) References Cited

U.S. PATENT DOCUMENTS

| | | | |
|---|---|---|---|
| 7,626,178 B2 | 12/2009 | Ivan et al. | |
| 8,232,530 B2 | 7/2012 | Pausch et al. | |
| 8,389,941 B2 | 3/2013 | Bendahan et al. | |
| 2003/0209671 A1* | 11/2003 | Frederick | G01T 1/202 |
| | | | 250/363.01 |
| 2005/0211904 A1* | 9/2005 | Ritter | H01L 27/14663 |
| | | | 250/363.02 |
| 2016/0041273 A1* | 2/2016 | Stowe | G01T 1/2023 |
| | | | 250/367 |
| 2016/0370493 A1* | 12/2016 | Bures | G01T 3/06 |

\* cited by examiner

DEVICE AND METHOD FOR THE LOCATION AND IDENTIFICATION OF A RADIATION SOURCE

CROSS-REFERENCE TO RELATED APPLICATION

The present patent application/patent is a continuation of co-pending U.S. patent application Ser. No. 15/474,626, filed on Mar. 30, 2017, and entitled "DEVICE AND METHOD FOR THE LOCATION AND IDENTIFICATION OF A RADIATION SOURCE," the contents of which are incorporated in full by reference herein,

STATEMENT REGARDING FEDERALLY SPONSORED RESEARCH OR DEVELOPMENT

The U.S. Government has rights to the present disclosure pursuant to Contract No. DE-NA0001942 between the U.S. Department of Energy and Consolidated Nuclear Security, LLC.

FIELD OF THE DISCLOSURE

The present disclosure relates generally to a handheld device and method for the location and identification of a radiation source. More specifically, the present disclosure relates to a handheld device and method for the location and identification of a radiation source that combines a "hot spot" locator with the capability to discriminate between fissile and non-fissile materials. Gamma location and gamma spectroscopy, gamma location and neutron detection, as well as gamma location, gamma spectroscopy, and neutron detection, applications are contemplated.

BACKGROUND OF THE DISCLOSURE

In general, it is difficult to locate and identify unknown sources of radiation. Often, complex and bulky devices utilizing many radiation detection crystals are necessary.

For example, U.S. Pat. No. 7,626,178 provides an integrated neutron-gamma radiation detector with an adaptively selected gamma threshold. An integrated radiation detector having a pulse-mode operating photosensor optically coupled to a gamma sensing element and a neutron sensing element is disclosed. The detector includes a pulse shape and processing electronics package that uses an analog to digital converter (ADC) and a charge to digital converter (QDC) to determine scintillation decay times and classify radiation interactions by radiation type. The pulse shape and processing electronics package determines a maximum gamma energy from the spectrum associated with gamma rays detected by the gamma sensing element to adaptively select a gamma threshold for the neutron sensing element. A light pulse attributed to the neutron sensing element is a valid neutron event when the amplitude of the light pulse is above the gamma threshold. However, this does not provide 4pi triangulation and does not solve the high gamma interference problem.

U.S. Pat. No. 7,335,891 provides a gamma and neutron radiation detector. A sensing element or detector activated by radiation includes a first scintillator activated by gamma radiation; and a neutron sensing layer including a second scintillator activated by neutron radiation. Again, this does not provide 4pi triangulation and does not solve the high gamma interference problem.

U.S. Pat. No. 8,232,530 provides a solid state neutron detector. A neutron detector for the detection of neutrons in fields with significant gamma or beta radiation includes a neutron sensitive scintillator crystal, providing a neutron capture signal being larger than the capture signal of 3 MeV gamma radiation, a semiconductor based photo detector being optically coupled to the scintillator crystal, where the scintillator crystal and the semiconductor based photo detector are selected so that the total charge collection time for scintillator signals in the semiconductor based photo detector is larger than the total charge collection time for signals generated by direct detection of ionizing radiation in the semiconductor based photo detector, the neutron detector further including a device for sampling the detector signals, a digital signal processing device, means which distinguish direct signals from the semiconductor based photo detector, caused by $\gamma$ or $\beta$-radiation and being at least partially absorbed in the semiconductor based photo detector, from light signals entering the semiconductor based photo detector, after being emitted from the scintillator crystal after capturing at least one neutron, by means of pulse shape discrimination, utilizing a difference between the total charge collection time for scintillator signals from the total charge collection time for signals generated by direct detection of ionizing radiation in the semiconductor based photo detector, and means which distinguish neutron induced signals from $\gamma$-radiation induced signals in the scintillator crystal by discriminating the different signals via their pulse height, making use of the difference between the number of photons generated by neutron and $\gamma$-radiation in the field of interest. However, this does not provide for the location or identification of radiation sources.

U.S. Pat. No. 8,389,941 provides a composite gamma-neutron detection system, including a gamma-neutron detector based on mixtures of thermal neutron absorbers that produce heavy-particle emission following thermal capture. The detector consists of one or more thin screens embedded in transparent hydrogenous light guides, which also serve as a neutron moderator. However, this is not portable and does not provide for the location of a radiation source.

Finally, US 20160041273 provides a combined thermal neutron detector and gamma-ray spectrometer system, including: a first detection medium including a lithium chalcopyrite crystal operable for detecting neutrons; a gamma ray shielding material disposed adjacent to the first detection medium; a second detection medium including one of a doped metal halide, an elpasolite, and a high Z semiconductor scintillator crystal operable for detecting gamma rays; a neutron shielding material disposed adjacent to the second detection medium; and a photodetector coupled to the second detection medium also operable for detecting the gamma rays; wherein the first detection medium and the second detection medium do not overlap in an orthogonal plane to a radiation flux. Optionally, the first detection medium includes a 6LiInSe2 crystal. Optionally, the second detection medium includes a SrI2(Eu) scintillation crystal. However, this does not provide for the location of a radiation source.

Thus, what is still needed in the art is a simple and compact device and method, such as a handheld device and method, for both locating and identifying a radiation source.

BRIEF SUMMARY OF THE DISCLOSURE

In various exemplary embodiments, the present disclosure provides a handheld device and method for the location and identification of a radiation source that combines a "hot spot" locator with the capability to discriminate between fissile and non-fissile materials. Gamma location and gamma spectroscopy, gamma location and neutron detection, as well as gamma location, gamma spectroscopy, and neutron detection, applications are contemplated.

In one exemplary embodiment, the present disclosure provides a handheld device for the location and identification of a radiation source, including: a radiation transparent housing; a radiation locator device disposed within the radiation transparent housing operable for determining the location of the radiation source, wherein the radiation locator device includes a plurality of gamma detection crystals arranged in a geometric pattern and separated by a gamma shielding material, a plurality of detectors coupled to the plurality of gamma detection crystals, and a processor module coupled to the plurality of detectors; one or more of a neutron detection crystal and a gamma spectroscopy crystal disposed within the radiation transparent housing adjacent to the radiation locator device; and one or more detectors coupled to the one or more of the neutron detection crystal and the gamma spectroscopy crystal and the processor module; wherein the one or more of the neutron detection crystal and the gamma spectroscopy crystal, the one or more detectors, and the processor module are collectively operable for identifying the radiation source. The neutron detection crystal includes one or more of a lithium containing chalcopyrite (such as LISe), a lithium elapsolite (such as CLYC), a lithium glass, or a lithium doped metal halide (such as LiNaI or LiSrI5). The gamma spectroscopy crystal includes one or more of SrI2, LaBr3, or CeBr3. Optionally, the gamma spectroscopy crystal is environmentally sealed. Optionally, the one or more detectors include one or more photodetectors. Identifying the radiation source includes discriminating between a fissile radiation source and a non-fissile radiation source. The device further includes a display coupled to the processor module operable for displaying the location and identification of the radiation source to a user. Optionally, the one or more of the neutron detection crystal and the gamma spectroscopy crystal include both a neutron detection crystal and a gamma spectroscopy crystal.

In another exemplary embodiment, the present disclosure provides a method for the location and identification of a radiation source, including: providing a radiation transparent housing; providing a radiation locator device disposed within the radiation transparent housing operable for determining the location of the radiation source, wherein the radiation locator device includes a plurality of gamma detection crystals arranged in a geometric pattern and separated by a gamma shielding material, a plurality of detectors coupled to the plurality of gamma detection crystals, and a processor module coupled to the plurality of detectors; providing one or more of a neutron detection crystal and a gamma spectroscopy crystal disposed within the radiation transparent housing adjacent to the radiation locator device; and providing one or more detectors coupled to the one or more of the neutron detection crystal and the gamma spectroscopy crystal and the processor module; wherein the one or more of the neutron detection crystal and the gamma spectroscopy crystal, the one or more detectors, and the processor module are collectively operable for identifying the radiation source. The neutron detection crystal includes one or more of a lithium containing chalcopyrite (such as LISe), a lithium elapsolite (such as CLYC), a lithium glass, or a lithium doped metal halide (such as LiNaI or LiSrI5). The gamma spectroscopy crystal includes one or more of SrI2, LaBr3, or CeBr3. Optionally, the gamma spectroscopy crystal is environmentally sealed. Optionally, the one or more detectors include one or more photodetectors. Identifying the radiation source includes discriminating between a fissile radiation source and a non-fissile radiation source. The method further includes providing a display coupled to the processor module operable for displaying the location and identification of the radiation source to a user. Optionally, the one or more of the neutron detection crystal and the gamma spectroscopy crystal include both a neutron detection crystal and a gamma spectroscopy crystal.

BRIEF DESCRIPTION OF THE DRAWINGS

The present disclosure is illustrated and described herein with reference to the various drawings, in which like reference numbers are used to denote like device components/method steps, as appropriate, and in which.

DETAILED DESCRIPTION OF THE DISCLOSURE

Again, the handheld device for the location and identification of a radiation source of the present invention combines a handheld "hot spot" locator with the capability to discriminate between fissile and non-fissile materials through the use of one or more additional solid state gamma detection crystals, gamma spectroscopy crystals, neutron detection crystals, and/or photodetectors.

Figure 1:
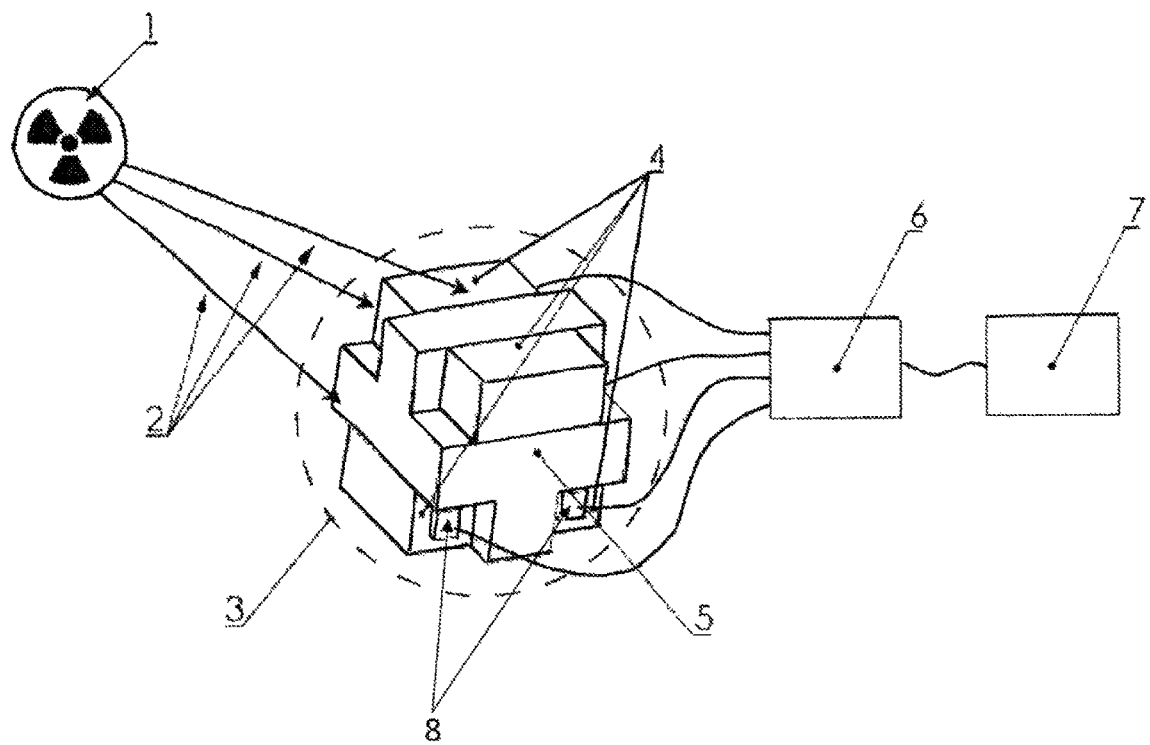
FIG. 1 is a schematic diagram illustrating one exemplary embodiment of the handheld "hot spot" locator of the present disclosure.

Referring now specifically to FIG. 1, in one exemplary embodiment, the "hot spot" locator (described in detail in SL 24520 to Petrovic, incorporated in full by reference herein) locates a radiation source 1 emitting gamma radiation 2 towards the locator via a gamma radiation transparent housing 3 encompassing a plurality of gamma detection crystals 4. As is shown, four low resolution pillar shaped crystals 4 (2×2×10 cm each, for example) are disposed at the opposed edges of a cube structure with a lead cross structure 5 filling the spaces between them, such that all directions are simultaneously monitored. The lead cross structure 5 provides gamma shielding, such that there is a differential response on each crystal 4 based on the direction of the radiation source 1. A proprietary data analysis and triangulation algorithm is implemented in a series of processors 6 and 7 coupled to a plurality of photodetectors 8 associated with the plurality of crystals 4. This provides gamma radiation detection with a full 4pi coverage area.

Figure 2:
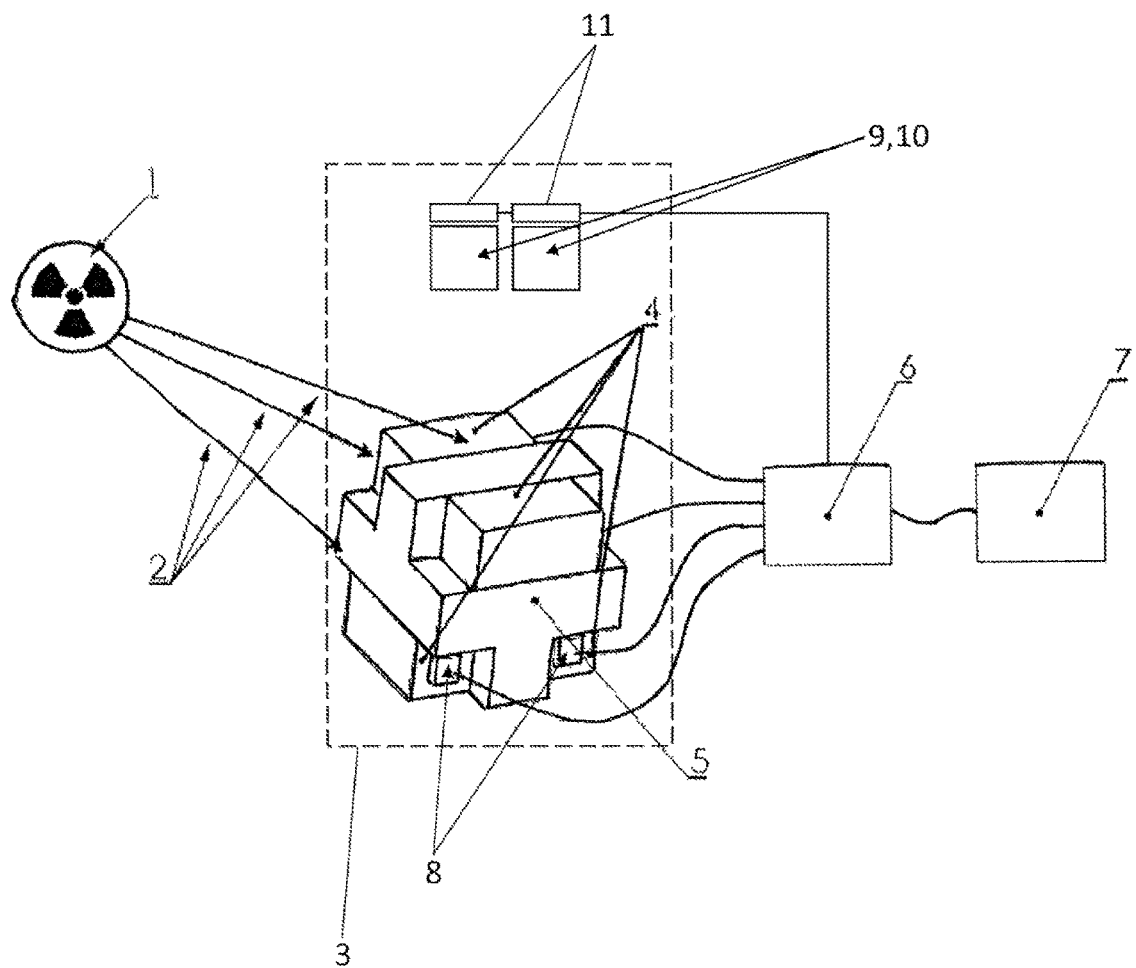
FIG. 2 is a schematic diagram of one exemplary embodiment of the handheld device for the location and identification of a radiation source of the present invention, combining the handheld "hot spot" locator of FIG. 1 with the capability to discriminate between fissile and non-fissile materials through the use of one or more additional solid state gamma detection crystals, gamma spectroscopy crystals, neutron detection crystals, and/or photodetectors.

Referring now specifically to FIG. 2, in one exemplary embodiment, for radiation source identification, as well as location, a room temperature gamma detection crystal 9 is also disposed within the housing 3, as well as the crystals 4 described herein above. To determine whether or not the radiation source 1 is fissile, this additional crystal 9 should be a solid state, gamma insensitive neutron detection crystal, such as a lithium containing chalcopyrite. This additional crystal 9 allows the gamma rays 2 of fissile material to be differentiated from gamma rays of non-fissile isotopes with similar energies. For simple identification, a 3-10% energy resolution gamma detecting scintillator, such as SrI2, LaBr3, or CeBr3, will suffice. An appropriate photodetector 11, such as SiPM or APD, is coupled to the additional crystal 9, as well as the processor(s) 6 and 7.

More specifically, in a gamma location and gamma spectroscopy application, the locator is coupled with an additional gamma spectroscopy crystal 10. The gamma spectroscopy crystal 10 could be SrI2, LaBr3, CeBr3, or another similar room temperature, solid state, scintillating detection crystal. Preferably the gamma spectroscopy crystal 10 is encapsulated to protect it from reacting with the environment. The gamma spectroscopy crystal 10 is optically coupled to a SiPM, APD, or the like, which is connected to the electronic read-out chain 6 and 7 that includes a multi-channel analyzer, for example.

The addition of spectroscopic capabilities improves the angular response of the device and its dose rate determination accuracy. This is because there is the possibility of compensation for interaction differences at different gamma ray energies. Roughly 2-3% energy resolution is achieved.

The addition of this spectroscopy functionality does not significantly affect the size of the locator, and all additional and necessary components fit into the original locator form factor.

In a gamma location and neutron detection application, the object is to locate fissile materials, or differentiate between gamma sources that are fissile and those that are not (Pu vs. medical I-131, for example). Neutron detection primarily involves thermal neutron counting as an indication of a radiation source 1 that emits neutrons.

The additional solid state neutron detection crystal 9 is coupled to a solid state photodetector 11, such as a SiPM or APD. A solid state neutron detection medium is required to achieve sufficient neutron absorber density within a portable handheld form factor. 6LiInSe2 or similar gamma insensitive thermal neutron scintillators are ideal for this embodiment.

The output is generated via a pulse height discriminator in counting mode, within the digital circuitry 6 and 7. Without using gamma spectroscopy, this version of the device can locate radiation, primarily based on the gamma signature, and indicate the presence of a neutron emitting isotope (i.e., fissile material).

In a gamma location, gamma spectroscopy, and neutron detection application, relatively large areas can be surveyed to find radioactive sources 1 and contamination quickly. Once a source of gamma radiation 1 is located, it is important to accurately identify the isotope causing the ionizing radiation in order to respond to its presence appropriately. This can be done with a series of gamma spectroscopy devices 10 and detection scintillators 11; however, each detection material has a unique detection efficiency, sensitivity (i.e., light yield), and energy resolution.

Identification capabilities are specifically limited by the inherent energy resolution of the detecting media. CsI(TI) and NaI(TI) reach an overall energy resolution just below 7% at 662 keV (Cs-137), which is insufficient for most applications of gamma spectroscopy.

However, using a gamma spectroscopy crystal 10, such as SrI2, LaBr3, CeBr3, or another similar gamma scintillator, allows spectroscopic resolution to reach 2-3% at 662 KeV. At this gamma energy resolution, sensitivity and selectivity of radiation detection devices become sufficient for most handheld applications.

One special case is the search for fissile materials. Fissile materials emit a number of gamma ray energies and these energies often overlap with other isotopes, most of which are not a threat. It is particularly important to differentiate and identify fissile material radiation from other isotopes. Gamma ray spectrometers, such as high purity Germanium (HPGe) or CdZnTe, which offer less than 1% energy resolution at 662 keV, are commonly used for this purpose. These spectrometers are, however, expensive and less portable.

In this version, employment of a medium resolution gamma spectrometer 10 and a neutron detection crystal 9 provide the same level of identification as the less portable spectrometers. As an example, medical iodine and fissile plutonium have gamma emissions with such similar energies that HPGe energy resolution is needed to distinguish them. Plutonium, however, emits neutrons, while medical iodine does not. Therefore, the combination of a gamma spectrometer and a neutron detector effectively provides identification without the need for ultra-high gamma spectroscopic resolution.

The device is designed to fit into the current locator form factor, with the neutron detection crystals 9 and/or gamma spectroscopy crystals 10, photodetectors 11, and optional circuity all placed either above or below the central location detection block. This circuitry integrates into the detection architecture. Results are displayed on the hot spot locator LCD, for example.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A handheld device for the location and identification of a radiation source, comprising:
   a radiation transparent housing;
   a radiation locator device disposed within the radiation transparent housing operable for determining the location of the radiation source, wherein the radiation locator device comprises a plurality of gamma detection crystals arranged in a geometric pattern and separated by a gamma shielding material, a plurality of detectors coupled to the plurality of gamma detection crystals, and a processor module coupled to the plurality of detectors;
   one or more of a neutron detection crystal and a gamma spectroscopy crystal disposed within the radiation transparent housing; and
   one or more detectors coupled to the one or more of the neutron detection crystal and the gamma spectroscopy crystal and the processor module;
   wherein the one or more of the neutron detection crystal and the gamma spectroscopy crystal, the one or more detectors, and the processor module are collectively operable for identifying the radiation source; and
   wherein the one or more of the neutron detection crystal and the gamma spectroscopy crystal comprise both a neutron detection crystal and a gamma spectroscopy crystal.

2. The device of claim 1, wherein the neutron detection crystal comprises one or more of a lithium containing chalcopyrite, a lithium elapsolite, a lithium glass, and a lithium doped metal halide.

3. The device of claim 1, wherein the gamma spectroscopy crystal comprises one or more of SrI2, LaBr3, and CeBr3.

4. The device of claim, 1, wherein the gamma spectroscopy crystal is environmentally sealed.

5. The device of claim 1, wherein the one or more detectors comprise one or more photodetectors.

6. The device of claim 1, wherein identifying the radiation source comprises discriminating between a fissile radiation source and a non-fissile radiation source.

7. The device of claim 1, further comprising a display coupled to the processor module operable for displaying the location and identification of the radiation source to a user.

8. A method for the location and identification of a radiation source, comprising:
   providing a radiation transparent housing;
   providing a radiation locator device disposed within the radiation transparent housing operable for determining the location of the radiation source, wherein the radiation locator device comprises a plurality of gamma detection crystals arranged in a geometric pattern and separated by a gamma shielding material, a plurality of detectors coupled to the plurality of gamma detection crystals, and a processor module coupled to the plurality of detectors;
   providing one or more of a neutron detection crystal and a gamma spectroscopy crystal disposed within the radiation transparent housing; and
   providing one or more detectors coupled to the one or more of the neutron detection crystal and the gamma spectroscopy crystal and the processor module;
   wherein the one or more of the neutron detection crystal and the gamma spectroscopy crystal, the one or more detectors, and the processor module are collectively operable for identifying the radiation source; and
   wherein the one or more of the neutron detection crystal and the gamma spectroscopy crystal comprise both a neutron detection crystal and a gamma spectroscopy crystal.

9. The method of claim 8, wherein the neutron detection crystal comprises one or more of a lithium containing chalcopyrite, a lithium elapsolite, a lithium glass, and a lithium doped metal halide.

10. The method of claim 8, wherein the gamma spectroscopy crystal comprises one or more of SrI2, LaBr3, and CeBr3.

11. The method of claim 8, wherein the gamma spectroscopy crystal is environmentally sealed.

12. The method of claim 8, wherein the one or more detectors comprise one or more photodetectors.

13. The method of claim 8, wherein identifying the radiation source comprises discriminating between a fissile radiation source and a non-fissile radiation source.

14. The method of claim 8, further comprising providing a display coupled to the processor module operable for displaying the location and identification of the radiation source to a user.

* * * * *